(12) United States Patent
Kadowaki (10) Patent No.: US 12,475,373 B2
(45) Date of Patent: Nov. 18, 2025

(54) INFORMATION PROCESSING APPARATUS AND METHOD AND PROGRAM FOR GENERATING INTEGRATED MODEL

(71) Applicant: DENSO CORPORATION, Kariya (JP)

(72) Inventor: Tadashi Kadowaki, Kariya (JP)

(73) Assignee: DENSO CORPORATION, Kariya (JP)

(*) Notice: Subject to any disclaimer, the term of this patent is extended or adjusted under 35 U.S.C. 154(b) by 1393 days.

(21) Appl. No.: 17/081,454

(22) Filed: Oct. 27, 2020

(65) Prior Publication Data

US 2021/0124988 A1    Apr. 29, 2021

(30) Foreign Application Priority Data

Oct. 28, 2019   (JP) .................................. 2019-194962
Sep. 11, 2020   (JP) .................................. 2020-152735

(51) Int. Cl.
*G06N 3/082*    (2023.01)
*G06F 17/18*    (2006.01)
(Continued)

(52) U.S. Cl.
CPC ............. *G06N 3/082* (2013.01); *G06F 17/18* (2013.01); *G06F 18/217* (2023.01);
(Continued)

(58) Field of Classification Search
CPC .......... G06N 3/082; G06N 20/20; G06N 3/08; G06F 18/217; G06F 18/285; G06F 17/18
See application file for complete search history.

(56) References Cited

U.S. PATENT DOCUMENTS

2019/0095756 A1   3/2019 Agrawal et al.
2020/0210812 A1*  7/2020 Baker .................... G06N 3/044
(Continued)

FOREIGN PATENT DOCUMENTS

CN        110222848 A    9/2019
JP        2019-133628 A  8/2019

OTHER PUBLICATIONS

Kim et al., "Learning to Warm-Start Bayesian Hyperparameter Optimization," arXiv:1710.06219v3 [stat.ML] Oct. 31, 2018 (Year: 2018).*

(Continued)

*Primary Examiner* — Miranda M Huang
*Assistant Examiner* — Yao David Huang
(74) *Attorney, Agent, or Firm* — Maschoff Brennan (57) ABSTRACT

An apparatus has a first function of selecting, from individual prediction models, candidate models, a second function of training the candidate models using a training dataset, a third function of applying a test dataset to a candidate integrated model to calculate an evaluation metric, and a fourth function of generating a regression expression between the evaluation metric and the candidate combination. A controller repeats a sequence of the first to fourth functions while the first function selects new individual models for each sequence until a termination condition is satisfied. The regression expression generated with an additional value of the evaluation metric from the new candidate combination for each sequence has a higher prediction accuracy on average as the number of the repeated sequences increases. A determiner determines an integrated model based on the candidate integrated models and values of the evaluation metric after the termination condition is satisfied.

12 Claims, 6 Drawing Sheets

(51) Int. Cl.
  G06F 18/20    (2023.01)
  G06F 18/21    (2023.01)
  G06N 3/08     (2023.01)
  G06N 20/20    (2019.01)
(52) U.S. Cl.
  CPC ............ *G06F 18/285* (2023.01); *G06N 3/08* (2013.01); *G06N 20/20* (2019.01)

(56) References Cited

U.S. PATENT DOCUMENTS

2020/0210876 A1* 7/2020 Rolfe ................... G06N 10/60
2020/0349416 A1  11/2020 Yang et al.
2021/0103858 A1* 4/2021 Padmanabhan ... G06F 18/24765

OTHER PUBLICATIONS

Khurana et al., "Automating Predictive Modeling Process using Reinforcement Learning," arXiv:1903.00743v1 [cs.LG] Mar. 2, 2019 (Year: 2019).*

Merentitis et al., "Ensemble Learning in Hyperspectral Image Classification: Toward Selecting a Favorable Bias-Variance Tradeoff," IEEE Journal of Selected Topics in Applied Earth Observations and Remote Sensing, vol. 7, No. 4, pp. 1089-1102, Apr. 2014 (Year: 2014).*

Raschka et al., "Model Evaluation, Model Selection, and Algorithm Selection in Machine Learning," arXiv:1811.12808v2 [cs.LG] Dec. 3, 2018 (Year: 2018).*

Levesque et al., "Bayesian Hyperparameter Optimization for Ensemble Learning," arXiv:1605.06394v1 [cs.LG] May 20, 2016 (Year: 2016).*

Chang et al., "Complementary prioritized ensemble selection," 2016 International Joint Conference on Neural Networks (IJCNN), Vancouver, BC, Canada, 2016, pp. 863-872 (Year: 2016).*

Baptista et al., "Bayesian Optimization of Combinatorial Structures," arXiv:1806.08838v2 [stat.ML] Oct. 10, 2018 (Year: 2018).*

T. Hartmann, A. Moawad, C. Schockaert, F. Fouquet and Y. Le Traon, "Meta-Modelling Meta-Learning," 2019 ACM/IEEE 22nd International Conference on Model Driven Engineering Languages and Systems (MODELS), Munich, Germany, 2019, pp. 300-305, doi: 10.1109/MODELS.2019.00014.

Lai K.K., Yu L., Huang W., Wang S. (2006) Multistage Neural Network Metalearning with Application to Foreign Exchange Rates Forecasting. In: Gelbukh A., Reyes-Garcia C.A. (eds) MICAI 2006: Advances in Artificial Intelligence. MICAI 2006. Lecture Notes in Computer Science, vol. 4293. Springer, Berlin, Heidelberg. https://doi.org/10.1007/11925231_32.

Baptista, Ricardo et al., Bayesian Optimization of Combinatorial Structures, Proceedings of the 35th International Conference on Machine Learning, Stockholm, Sweden, Oct. 10, 2018, 15 pgs.

* cited by examiner

FIG.8

INFORMATION PROCESSING APPARATUS AND METHOD AND PROGRAM FOR GENERATING INTEGRATED MODEL

CROSS REFERENCE TO RELATED APPLICATION

This application is based on and claims the benefit of priority from Japanese Patent Applications No. 2019-194962 filed on Oct. 28, 2019 and No. 2020-152735 filed on Sep. 11, 2020, and the disclosure of each of these applications is incorporated in its entirety herein by reference.

TECHNICAL FIELD

The present disclosure relates to information processing apparatuses, and methods and programs for generating an integrated model.

BACKGROUND

Machine learning using, for example, neural networks has been widely performed in recent years, an example of which is disclosed in Japanese Patent Application Publication No. 2019-133628.

One type of methods, which aims to improve the prediction accuracy of a trained model generated by machine learning using a neural network, is known as meta-learning methods. These meta-learning methods integrate plural trained models with each other using different algorithms and/or datasets to thereby generate an integrated model.

SUMMARY

These meta-learning methods include ensemble learning methods, which are also called stacked learning methods. These ensemble learning methods use an integrated model comprised of plural trained models to determine, as a value predicted by the integrated model, a majority decision among values respectively predicted by the trained models.

These ensemble leaning methods also include various types of methods. The first type of the ensemble learning methods uses a single-layered neural network comprised of trained models without providing any weights to each of the trained models, and the second type of the ensemble learning methods uses a multi-layered neural network comprised of trained models to provide weights to each of the trained models.

For example, a known method of generating an integrated model comprised of plural trained models is to consider all allowable combinations of plural trained models, and extract, from all the allowable combinations, one combination that is suitable for an integrated model. Such a method however may result in a longer time required to generate an integrated model becoming larger as the number of trained models.

Users of meta-learning methods therefore hope to acquire simpler methods of generating an integrated model comprised of plural trained models.

In view of the circumstances set forth above, an exemplary aspect of the present disclosure seeks to provide information processing apparatuses and methods and programs for generating an integrated model, each of which is capable of generating an integrated model comprised of plural models more simply.

An apparatus for generating an integrated model from a plurality of individual prediction models according to a first aspect of the present disclosure is provided. The apparatus according to the first aspect includes a selector having a first function of selecting, from the plurality of individual prediction models, plural individual prediction models as candidate models that constitute a candidate integrated model, and a training unit having a second function of training the candidate models using a training dataset.

The apparatus according to the first aspect includes an evaluation metric calculator having a third function of applying a test dataset to the candidate integrated model to calculate an evaluation metric for evaluating an output of the candidate integrated model, and a regression expression generator having a fourth function of generating a regression expression that represents a relationship between the evaluation metric and the candidate integrated model.

The apparatus according to the first aspect includes a controller configured to cause the selector, the training unit, the evaluation metric calculator, and the regression expression generator to repeatedly perform a sequence of the first function, the second function, the third function, and the fourth function while the first function of the selector selects new individual models that constitute a new candidate integrated model for each sequence until a predetermined termination condition is satisfied. The regression expression generated with an additional value of the evaluation metric from the new candidate combination for each sequence has a higher prediction accuracy on average as the number of the repeated sequences increases.

The apparatus according to the first aspect includes a determiner configured to deter mine an integrated model based on the candidate integrated models and values of the evaluation metric after the termination condition is satisfied.

An apparatus for generating an integrated model from a plurality of individual prediction models according to a second aspect of the present disclosure is provided. The apparatus according to the second aspect includes a selector having a first function of selecting, from the plurality of individual prediction models, plural individual models as candidate models that constitute a candidate integrated model, an evaluation metric calculator having a second function of applying a test dataset to the candidate integrated model to calculate an evaluation metric for evaluating an output of the candidate integrated model, and a regression expression generator having a third function of generating a regression expression that represents a relationship between the evaluation metric and the candidate integrated model.

The apparatus according to the second aspect includes a controller configured to cause the selector, the evaluation metric calculator, and the regression expression generator to repeatedly perform a sequence of the first function, the second function, and the third function while the first function of the selector selects new individual models that constitute a new candidate integrated model for each sequence until a predetermined termination condition is satisfied. The regression expression generated with an additional value of the evaluation metric from the new candidate combination for each sequence has a higher prediction accuracy on average as the number of the repeated sequences increases.

The apparatus according to the second aspect includes a determiner configured to deter mine an integrated model based on the candidate integrated models and values of the evaluation metric after the termination condition is satisfied.

A method of generating an integrated model from a plurality of individual prediction models according to a third aspect of the present disclosure is provided. The method according to the third aspect includes performing a first process of selecting, from the plurality of individual prediction models, plural individual prediction models as candidate models that constitute a candidate integrated model, and performing a second process of training the candidate models using a training dataset.

The method according to the third aspect includes performing a third process of applying a test dataset to the candidate integrated model to calculate an evaluation metric for evaluating an output of the candidate integrated model, and performing a fourth process of generating a regression expression that represents a relationship between the evaluation metric and the candidate integrated model.

The method according to the third aspect includes repeatedly performing a sequence of the first process, the second process, the third process, and the fourth process while the first process selects new individual models that constitute a new candidate integrated model for each sequence until a predetermined termination condition is satisfied. The regression expression generated with an additional value of the evaluation metric from the new candidate combination for each sequence has a higher prediction accuracy on average as the number of the repeated sequences increases.

The method according to the third aspect includes determining an integrated model based on the candidate integrated models and values of the evaluation metric after the termination condition is satisfied.

A program product according to a fourth aspect of the present disclosure is provided. The program product includes a non-transitory computer-readable storage medium, and a set of computer program instructions stored in the computer-readable storage medium. The instructions cause a computer to serve as
(i) First means for performing a first process of selecting, from the plurality of individual models, plural individual models as candidate models that constitute a candidate integrated model
(ii) Second means for performing a second process of training the candidate models using a training dataset
(iii) Third means for performing a third process of applying a test dataset to the candidate integrated model to calculate an evaluation metric for evaluating an output of the candidate integrated model
(iv) Fourth means for performing a fourth process of generating a regression expression that represents a relationship between the evaluation metric and the candidate integrated model
(v) Fifth means for causing the first means, the second means, the third means, and the fourth means repeatedly perform a sequence of the first process, the second process, the third process, and the fourth process while the first process of the first means selects new individual models that constitute a new candidate integrated model for each sequence until a predetermined termination condition is satisfied, the regression expression generated with an additional value of the evaluation metric from the new candidate combination for each sequence having a higher prediction accuracy on average as the number of the repeated sequences increases
(vi) Sixth means for determining an integrated model based on the candidate integrated models and values of the evaluation metric after the termination condition is satisfied.

Each of the first to fourth aspects of the present disclosure makes it possible to generate an integrated model comprised of plural individual prediction models more simply.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

The following describes an exemplary embodiment of the present disclosure with reference to the accompanying drawings. In the exemplary embodiment and its modifications, like parts between the exemplary embodiment and its modifications may be omitted or simplified to avoid redundant description.

Figure 1:
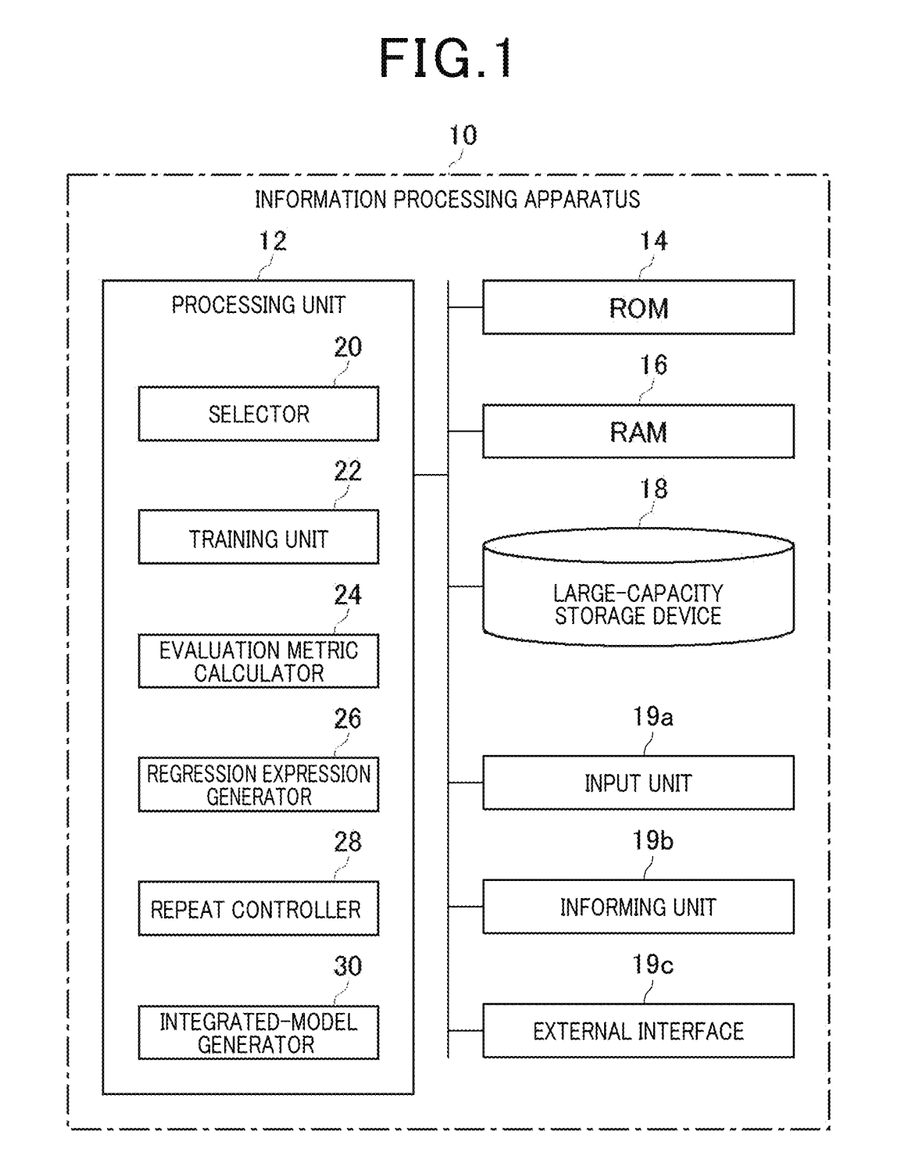
FIG. 1 is a block diagram schematically illustrating an example of the schematic structure of an information processing apparatus according to an exemplary embodiment of the present disclosure.

FIG. 1 is a block diagram schematically illustrating an example of the structure of an information processing apparatus 10 according to the exemplary embodiment of the present disclosure.

Referring to FIG. 1, the information processing apparatus 10 of the exemplary embodiment includes a processing unit 12 comprised of, for example, one or more quantum computers, in other words, quantum processors. The information processing apparatus 10 also includes, for example, a read only memory (ROM) 14, a random-access memory (RAM) 16, and a large-capacity storage device 18. These devices 14, 16, and 18 are communicably connected to the processing unit 12.

The ROM 12 has stored various programs and various pieces of data. The RAM 14 serves as a working area where the processing unit 12 executes the various programs. The large-capacity storage device 18 has stored, for example, various algorithms, i.e. algorithm programs, and various datasets.

A quantum computer, which can constitute the processing unit 12, uses quantum bits to perform various computing operations, such as calculations; the quantum bits are each defined as an information unit based on one or more materials that have quantum mechanical behaviors. Any classical computer, which uses classical bits respectively representing information units, can constitute the processing unit 12; the classical bits can be each implemented by, for example, one or more CMOS transistors. One or more quantum computers and one or more classical computers can constitute the processing unit 12. That is, a part of the functions or all of the functions of the processing unit 12 of the information processing apparatus 10 can be implemented by at least one quantum computer.

The large-capacity storage device 18 has stored (i) plural models, for example, constituting a neural network described hereinafter, (ii) datasets to be used to train the models, and (iii) at least one program that causes the processing unit 12 to perform an integrated-model generating routine for generating an integrated model. The large-capacity storage device 18 can be comprised of, for example, a hard-disk drive (HDD), a semiconductor storage device, or another type of storage device.

Each model represents, for example, a data structure that is comprised of a functional form and model parameters. Each model for example describes an observed or predicted behavior of a selected target system, and is configured to output data in response to input data being inputted thereto.

The information processing apparatus 10 additionally includes an input unit 19a, an informing unit 19b, and an external interface 19c; these units 19a to 19c are communicably connected to the processing unit 12.

The input unit 19a is comprised of at least one input device, such as a touch panel, plural buttons, a keyboard, a mouse, and/or a pointing device. The input unit 19a enables users to operate the at least one input device to enter various information items, receives the entered information items, and sends the received information items to the processing unit 12.

The informing unit 19b includes, for example, a display and/or a speaker. The informing unit 19b is configured to provide, to users, visible and/or audible information through the display and/or speaker.

The external interface 19c is communicably connected with external apparatuses, such as other external information processing apparatuses. The external interface 19c enables the processing unit 12 to communicate various data items with the external apparatuses therethrough.

In particular, the information processing apparatus 10 is configured to implement various functions including an integrated-model generating function of generating an integrated model comprised of plural models for performing, for example, an ensemble learning method; these plural models will also be referred to as individual models.

The individual models according to the exemplary embodiment each serve as, for example, a predictor.

Specifically, the processing unit 12 includes a selector 20, a training unit 22, an evaluation metric calculator 24, a regression expression generator 26, a repeat controller 28, and an integrated-model generator 30.

First, the following describes a brief summary of how to generate an integrated model.

The information processing apparatus 10 performs a first process or step of selecting, from the individual models, plural individual models as candidate models that constitute a candidate integrated model.

Then, the information processing apparatus 10 performs a second process or step of training each of the candidate models of the candidate integrated model, and performs a third process or step of calculating an evaluation metric for the created candidate integrated model. Thereafter, the information processing apparatus 10 performs a fourth process or step of generating a regression expression for the candidate integrated model based on the relationship between the candidate integrated model and the evaluation metric corresponding thereto; this regression expression is a prediction expression for predicting the evaluation metric for the candidate integrated model.

Next, the information processing apparatus 10 performs a fifth process or step of repeating a sequence of the first to fourth processes or steps while the first process or step selects new individual models that constitute a new candidate integrated model from the individual models for each sequence until a predetermined termination condition of the repeating of the sequence is satisfied. The regression expression generated with an additional evaluation metric from the new candidate combination for each sequence has a higher prediction accuracy on average as the number of the repeated sequences increases.

The information processing apparatus 10 performs a sixth process or step of determining an integrated model based on the candidate integrated models and values of the evaluation metric after the termination condition is satisfied.

Next, the following describes each component included in the processing unit 12.

The selector 20 is configured to select, from the individual models, plural models as candidate models that constitute a candidate integrated model. For example, the selector 20 can be configured to randomly select, from the individual models, plural models as candidate models for the first sequence, and to select, from the individual models, plural models as candidate models in accordance with a minimization function for each of the second sequence and subsequent sequences. How the selector 20 selects plural models as candidate models in accordance with the minimization function for each of the second sequence and subsequent sequences will be described later.

The training unit 22 is configured to train the candidate models of the candidate integrated model selected by the selector 20.

Figure 2:
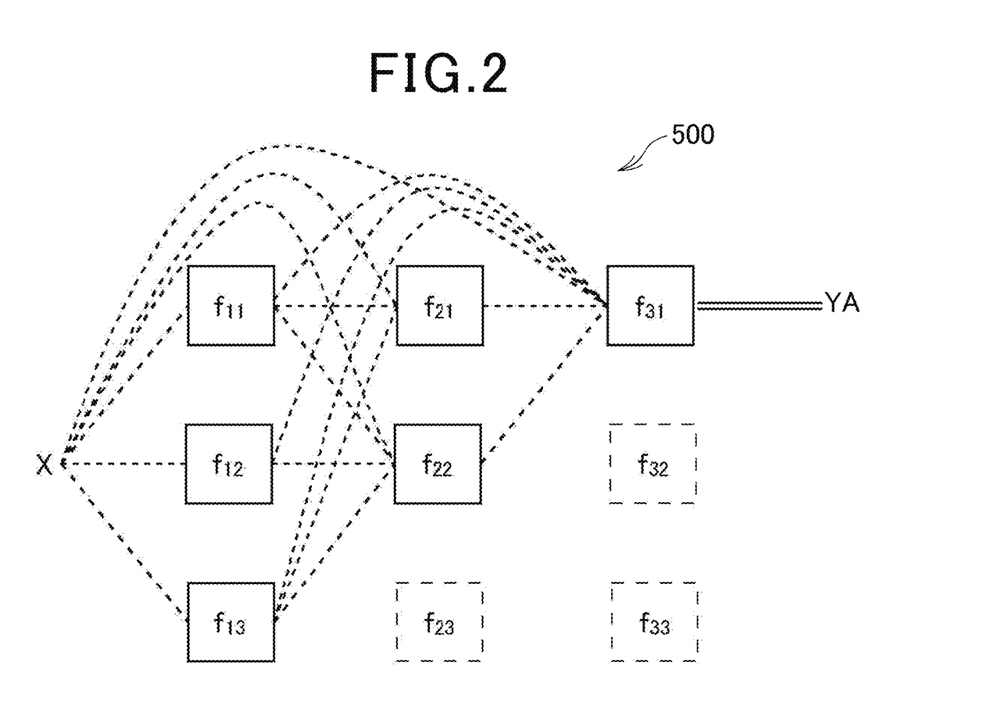
FIG. 2 is a diagram schematically illustrating an example of candidate models, i.e. individual models, selected by a selector illustrated in FIG. 1.

The following describes how the selector 20 selects, from the individual models, a combination, i.e. a candidate integrated model, Sc of candidate models, and how the training unit 22 trains the candidate models with reference to FIG. 2.

FIG. 2 schematically illustrates the candidate models, i.e. individual models, $f_{kr}$ selected by the selector 20. Plural individual models selected as the candidate models $f_{kr}$ can respectively have the same functional form or different functional forms. In addition, plural individual models can respectively have the same dataset or different datasets.

FIG. 2 illustrates that the candidate models $f_{kr}$ are arranged to have a layered structure, and the number of candidate models constituting each layer of the layered structure is set to be a predetermined constant value, but the number of candidate models constituting any layer of the layered structure can be set to be different from that constituting another layer thereof.

For example, the information processing apparatus 10 according to the exemplary embodiment is configured to generate a candidate integrated model that is designed as a neural network having a layered structure comprised of a predetermined number of successive layers. The number of layers of the candidate integrated model according to the exemplary embodiment is, for example, set to three. That is, the candidate integrated model to be generated by the information processing apparatus 10 has the first layer, the second layer, and the third layer.

FIG. 2 illustrates the neural network to which reference numeral 50 has been labeled. The neural network 50 can be implemented in, for example, the RAM 16 or the large-capacity storage device 18.

FIG. 2 illustrates an example where
1. The individual models stored in the large-capacity storage device 18 are models $f_{11}, f_{12}, f_{13}, f_{21}, f_{22}, f_{23}, f_{31}, f_{32}$, and $f_{33}$, i.e., models $f_{kr}$ (k=1, 2, 3, r=1, 2, 3)
2. At least one of the individual models $f_{1r}$ constitutes the first layer
3. At least one of the individual models $f_{2r}$ constitutes the second layer
4. At least one of the individual models $f_{3r}$ constitutes the third layer For example, as illustrated in FIG. 2, the first layer of the neural network 50 is comprised of selected candidate models $f_{11}, f_{12}$, and $f_{13}$, i.e. models $f_{1r}$ (r=1, 2, 3), the second layer, i.e. intermediate layer, is comprised of selected candidate models $f_{21}$ and $f_{22}$, i.e. models $f_{2r}$ (r=1, 2), and the third layer of the neural network 50 is comprised of a selected candidate model $f_{31}$.

As illustrated in FIG. 2, each of the candidate models $f_{11}, f_{12}$, and $f_{13}$ included in the first layer is connected to all the candidate models $f_{21}$ and $f_{22}$ included in the second layer, and each of the candidate models $f_{21}$ and $f_{22}$ included in the second layer is connected to every candidate model, i.e. the candidate model $f_{31}$, included in the third layer.

At least one model selected for any layer can be the same as at least one mode selected for another layer. For example, a model A can be used as the candidate model $f_{11}$, the candidate model $f_{21}$, and the candidate model $f_{31}$, so that each layer has the same model A. That is, the information processing apparatus 10 is capable of exhaustively analyzing an integrated-model candidate comprised of the model A selected for the first layer, another integrated-model candidate comprised of the model A selected for the second layer, and a further integrated-model candidate comprised of the model A selected for the third layer.

In FIG. 2, candidate models $f_{23}, f_{32}$, and $f_{33}$ each marked by a dashed square show models included in the individual models and unselected by the selector 20.

As described above, the candidate integrated model Sc selected from the individual models $f_{11}$ to $f_{33}$ includes
1. A least one model selected from the individual models $f_{11}$ to $f_{13}$, which constitutes the first layer
2. At least one model selected from the individual models $f_{21}$ to $f_{23}$, which constitutes the second layer
3. At least one model selected from the individual models $f_{31}$ to $f_{33}$, which constitutes the third layer The exemplary embodiment defines selection indicators $s_{kr}$ each of which represents which of the individual models $f_{11}$ to $f_{33}$ is selected to be included in the candidate integrated model Sc, each of reference characters k and r is set to one of 1 to 3.

More specifically, the selection indicators $s_{kr}$ include
1. The selection indicator $s_{1r}$ that represents which of the individual models $f_{11}$ to $f_{13}$ is selected to constitute the first layer
2. The selection indicator $s_{2r}$ that represents which of the individual models $f_{21}$ to $f_{23}$ is selected to constitute the second layer
3. The selection indicator $s_{3r}$ that represents which of the individual models $f_{31}$ to $f_{33}$ is selected to constitute the third layer That is, the selection indicators $s_{kr}$ are comprised of the selection indicators $s_{11}, s_{12}, s_{13}, s_{21}, s_{22}, s_{23}, s_{31}, s_{32}$, and $s_{33}$.

Any one of the selection indicators $s_{11}, s_{12}, s_{13}, s_{21}, s_{22}, s_{23}, s_{31}, s_{32}$, and $s_{33}$, which is set to 1, shows that the corresponding individual model $f_{kr}$ is included in the candidate integrated model Sc, and any one of the selection indicators $s_{11}, s_{12}, s_{13}, s_{21}, s_{22}, s_{23}, s_{31}, s_{32}$, and $s_{33}$, which is set to 0, shows that the corresponding individual model $f_{kr}$ is not included in the candidate integrated model Sc.

Thus, the candidate integrated model Sc can be expressed as the corresponding parameter set $\{s_{11}, s_{12}, s_{13}, s_{21}, s_{22}, s_{23}, s_{31}, s_{32},$ and $s_{33}\}$. For example, the exampled candidate integrated model Sc illustrated in FIG. 2 can be expressed as the corresponding parameter set $\{1, 1, 1, 1, 1, 0, 1, 0, 0\}$.

The selector 20 of the exemplary embodiment performs a selection task of selecting, from the individual models $f_{kr}$, i.e. the individual models $f_{11}, f_{12}, f_{13}, f_{21}, f_{22}, f_{23}, f_{31}, f_{32}$, and $f_{33}$, candidate models whose number is smaller than the total number of the individual models $f_{kr}$. For this reason, the candidate integrated model Sc of the candidate models $f_{kr}$ essentially includes at least one candidate model $f_{kr}$ with the corresponding at least one selection indicator $s_{kr}$ being 0.

The training unit 22 performs a training task of training the candidate models $f_{kr}$ of the candidate integrated model Sc selected by the selector 20.

For example, the training unit 22 trains the candidate models $f_{kr}$ of the candidate integrated model Sc using a training dataset (X, Y) comprised of input data items X and output data items, i.e. ground-truth data items, Y that are respectively paired to the input data items X.

Briefly, the training unit 22 performs the training from the first layer to successive layers. In each layer, the training unit 22 performs the training task of
(1) Inputting the input data items X of the training dataset (X, Y) to a candidate model $f_{kr}$ specified by the candidate integrated model Sc, so that the candidate model $f_{kr}$ outputs a value
(2) Calculating the difference between each of the output data items Y of the training dataset (X, Y) and the corresponding one of the outputted values of the candidate model $f_{kr}$
(3) Calculating a summarized value, such as an average of the calculated differences, as an error
(4) Repeating the sequences (1) to (3) while changing the value of each model parameter of the candidate model until the error is minimized The exemplary embodiment defines the sequences (1) to (4) as training of the candidate models in a layer of the candidate integrated model Sc.

That is, the information processing apparatus 10 of the exemplary embodiment aims to train the candidate models of the candidate integrated model; the error of the candidate integrated model becomes a minimum value.

Specifically, the training unit 22 of the exemplary embodiment inputs the input data items X of the training dataset (X, Y) to each of the candidate models $f_{11}, f_{12},$ and $f_{13}$ included in the first layer. This causes each of the candidate models $f_{11}, f_{12},$ and $f_{13}$ to output data items. Hereinafter, the outputted data items from the candidate model $f_{11}$ in response to the input data items X being inputted thereto will be referred to as output data items $f_{11}(X)$.

Similarly, the outputted data items from the candidate model $f_{12}$ in response to the input data items X being inputted thereto will be referred to as output data items $f_{12}(X)$, and the outputted data items from the candidate model $f_{13}$ in response to the input data items X being inputted thereto will be referred to as output data items $f_{13}(X)$.

Next, the training unit 22 performs the training task of inputting, to each of the candidate models $f_{21}$ and $f_{22}$ included in the next second layer, the input data items X and the output data items $f_{11}(X), f_{12}(X),$ and $f_{13}(X)$ outputted from at least one previous layer, i.e. the first layer. This causes each of the candidate models $f_{21}$ and $f_{22}$ to output data items. Hereinafter, the outputted data items from the candidate model $f_{21}$ will be referred to as output data items $f_{21}(X)$. Similarly, the outputted data items from the candidate model $f_{22}$ will be referred to as output data items $f_{22}(X)$.

In other words, the input data items X and the output data items $f_{11}(X), f_{12}(X),$ and $f_{13}(X)$ outputted from the candidate models included in the at least one previous layer, i.e. the first layer, are used to train each of the candidate models $f_{21}$ and $f_{22}$ of the second layer. The candidate model $f_{21}$ of the second layer to be trained can be expressed as the candidate model $f_{21}(X, f_{11}(X), f_{12}(X), f_{13}(X))$, and similarly the candidate model $f_{22}$ of the second layer to be trained can be expressed as the candidate model $f_{22}(X, f_{11}(X), f_{12}(X), f_{13}(X))$.

Subsequently, the training unit 22 performs the training task of inputting, to the candidate model $f_{31}$ included in the next third layer, the input data items X, the output data items $f_{11}(X), f_{12}(X),$ and $f_{13}(X)$, and the output data items $f_{21}(X)$ and $f_{22}(X)$, which are outputted from the previous first and second layers. This causes the candidate model $f_{31}$ to output data items. Hereinafter, the outputted data items from the candidate model $f_{31}$ will be referred to as output data items $f_{31}(X)$.

In other words, the input data items X, the output data items $f_{11}(X), f_{12}(X),$ and $f_{13}(X)$ outputted from the previous first layer, and the output data items $f_{21}(X)$ and $f_{22}(X)$ outputted from the previous second layer are used to train the candidate model $f_{31}$ of the third layer. The candidate model $f_{31}$ of the third layer to be trained can be expressed as the candidate model $f_{31}(X, f_{11}(X), f_{12}(X), f_{13}(X), f_{21}(X), f_{22}(X))$. Because the third layer of the neural network 50 according to the exemplary embodiment serves as an output layer of the neural network 50, the output data items $f_{31}(X)$ outputted from the output layer show the output data items YA.

If the neural network 50 is comprised of more than 3 layers, the training unit 22 is configured to
  (1) Input the input data items X paired to the respective output data items Y to the first layer of the neural network 50
  (2) Input, to each of the second and the successive layers, the training data items X and the output data items from each candidate model included from all the previous layers Because, for example, the individual model $f_{23}$ is not selected so that the candidate integrated layer Sc does not include the individual model $f_{23}$, the individual model $f_{23}$ is not trained by the training unit 22. This therefore results in no output data items from the individual model $f_{23}$ being used to train the candidate models.

Note that any candidate model trained by the training unit 22 will also be referred to as a trained candidate model.

The information processing apparatus 10 of the exemplary embodiment is configured to evaluate the performance of the candidate integrated model trained by the training unit 22 using a test dataset (V, W) that have the same type as the type of the training dataset (X, Y); the test dataset (V, W) is comprised of input data items V and output data items W that are respectively paired to each other.

The test dataset (V, W) is preferably configured to be different from the training dataset (X, Y), but can be configured to be identical to the training dataset (X, Y).

For example, the exemplary embodiment uses, as the input data items X, M vector data items (M is an integer more than or equal to 2); each of the M vector data items is comprised of gray-scale image data having a total number of d pixels (d is an integer more than or equal to 1). In other words, the M vector data items can be represented as M gray-scale image data items. Each of the input data items X is d-dimensional vector data, and each of the output data items Y, which is paired to the corresponding one of the input data items X, is scalar data, so that each of the output data items YA is also scalar data.

The information processing apparatus 10 according to the exemplary embodiment is configured to use, as the training dataset (X, Y), a training dataset (X, Y) comprised of m gray-scale image data items included in the M gray-scale image data items and output data items that are respectively paired to the m gray-scale image data items (m is an integer more than or equal to 1, and is smaller than M).

For example, the training unit 22 of the exemplary embodiment is configured to perform the training task of
  1. Inputting the m gray-scale image data items to each of the candidate models $f_{kr}$ for training the corresponding one of the candidate models $f_{kr}$
  2. Using the remaining (M−m) image data items as test data items for testing the performance of the candidate integrated model Sc of the candidate models $f_{kr}$ trained by the training unit 22

The information processing apparatus 10 of the exemplary embodiment can be configured such that the test dataset (V, W) is separately prepared, and all the M gray-scale image data items are used as the input data items X of the training dataset (X, Y). The information processing apparatus 10 of the exemplary embodiment can also be configured such that the input data items X of the training dataset (X, Y) are separately prepared, and all the M gray-scale image data items are used as the test dataset (V, W).

The evaluation metric calculator 24 performs an evaluation-metric calculation task of applying the test dataset (V, W) to the candidate integrated model Sc comprised of the candidate models $f_{kr}$ to thereby calculate an evaluation metric for evaluating the output of the candidate integrated model Sc.

For example, the evaluation metric calculator 24 inputs the input data items V, which are paired to the respective output data items W, to the first layer of the neural network 50 in a manner similar to the training task to calculate, as a parameter indicative of the evaluation metric, the absolute difference between each of the output data items, i.e.

ground-truth data items, W of the test dataset (V, W) and the corresponding one of the outputted data items WA from the candidate integrated model Sc. More specifically, the evaluation metric calculator 24 calculates, as a value of the evaluation metric, the average of the calculated absolute differences between the output data items W of the test dataset (V, W) and the corresponding respective outputted data items WA. The calculated average representing the evaluation metric for the integrated-model candidate will be referred to as an error Z. In particular, the value of the error Z obtained by the evaluation metric calculator 24 will also be referred to as an actually calculated value of the error Z.

The regression expression generator 26 performs a regression-expression generation task of generating a regression expression based on the candidate integrated-model Sc and the corresponding error, i.e. evaluation metric, Z; the regression expression represents the relationship between the combination Sc and the corresponding error Z.

Specifically, the regression expression generator 26 uses individual candidate-model variables $s_i$ and $s_j$ to generate the regression expression in accordance with the following expression (1):

$$Z = \sum_{i,j} a_{ij} s_i s_j + \sum_i b_i s_i \quad (1)$$

where $a_{ij}$ represents weight parameters for the product of the candidate-model variables $s_i$ and $s_j$, and $b_i$ represents the weight parameter for the candidate-model variable $s_i$.

That is, the above regression expression (1) predicts a value of the error Z as a function of the candidate-model variables, so that a value of the error Z obtained based on the regression expression (1) is also be referred to as a predicted value of the error Z.

Each of the candidate-model variables $s_i$ and $s_j$ corresponds to the selection indicator $s_{kr}$, so that each of the candidate-model variables $s_i$ and $s_j$ is 1 upon the corresponding candidate model $f_{kr}$ being included in the candidate integrated-model Sc, and is 0 upon the corresponding candidate model $f_{kr}$ being not included in the candidate integrated-model Sc.

That is, the regression expression (1), which predicts the error Z serving as the evaluation metric for the candidate integrated-model Sc, represents the sum of
 (1) The total sum of the products of the weight parameters $a_{ij}$ and the values of the product of the candidate-model variables $s_i$ and $s_j$ for the candidate integrated-model Sc
 (2) The total sum of the products of the weight parameters bi and the values of the respective candidate-model variable $s_i$ for the candidate integrated-model Sc For example, if the candidate integrated-model Sc is expressed as the corresponding parameter set {1, 1, 1, 1, 1, 0, 1, 0, 0} (see FIG. 2), the candidate-model variable $s_i$ can be represented as the candidate-model variable $s_i$ (i=1, ..., 9), i.e., $s_1, s_2, ..., s_9$, and the candidate-model variable $s_j$ can be represented as the candidate-model variable $s_j$ (j=1, ..., 9), i.e., $s_1, s_2, ..., s_9$. In addition, the weight parameters $a_{ij}$ can be represented as the weight parameters $a_{ij}$ (i, j=1, ..., 9), i.e., $a_{11}, a_{12}, ..., a_{19}, a_{21}, ..., a_{99}$, and the weight parameters $b_i$ can be represented as the weight parameters $b_i$ (i=1, ..., 9), i.e., $b_1, b_2, ..., b_9$.

Thus, the regression expression (1) can be expressed as follows:

$Z = a_{11} \times s_1 \times s_1 + a_{12} \times s_1 \times s_2 + a_{13} \times s_1 \times s_3 + \ldots + a_{19} \times s_1 \times s_9 + a_{21} \times s_2 \times s_1 + \ldots + a_{29} \times s_2 \times s_9 + a_{31} \times s_3 \times s_1 + \ldots a_{89} \times s_8 \times s_9 + a_{99} \times s_9 \times s_9 + b_1 s_1 + \ldots + b_9 s_9$.

That is, the error Z can be expressed based on the product of each pair of the candidate-model variables $s_i$ and the candidate-model variables $s_j$, and the candidate-model variables $s_i$.

As described later in detail, the regression expression generator 26 is for example configured to statistically determine a value of each weight parameter $a_{ij}$ and a value of each weight parameter $b_i$ in accordance with a probability distribution $P(a_{ij})$ of the corresponding weight parameter $a_{ij}$ and a probability distribution $P(b_i)$ of the corresponding weight parameter $b_i$.

The exemplary embodiment uses the regression expression (1) as a model to predict the error Z, so that the error Z, which is a function of the regression expression (1), can be referred to as a minimization function.

The regression expression has second-order terms, but can have the third-order or higher-order terms. The regression expression having the third-order or higher-order terms enables a more suitable integrated model to be generated than the regression expression having second-order terms. Using auxiliary variables used to express the third-order or higher-order terms enables the regression expression to be expressed based on second-order terms.

When a sequence of the selection task of the selector 20, the training task of the training unit 22, the evaluation-metric calculation task of the evaluation metric calculator 24, and the regression expression generation task of the regression expression generator 26 is carried out first time, data indicative of the relationship between the candidate integrated-model Sc and the corresponding error Z is at least one data item. An increase in execution of the number of the sequences while selecting candidate models constituting the candidate integrated-model Sc enables the number of data items stored in, for example, the large-capacity storage device 18, each of which represents the relationship between the candidate integrated-model Sc and the corresponding error Z, to increase.

In other words, repeating of the sequence while selecting candidate models constituting the candidate integrated-model Sc enables the latest regression expression generated by the regression expression generation task of the latest sequence to have, on average, higher accuracy of predicting the evaluation-metric for evaluating the corresponding candidate integrated-model Sc.

Specifically, the repeat controller 28 causes the selector 20, training unit 22, evaluation metric calculator 24, and regression expression generator 26 to repeat the sequence of the respective selection task, training task, evaluation-metric generation task, and regression expression generation task while causing the selector 20 to select candidate models constituting the candidate integrated-model Sc in order to increase the prediction accuracy of the latest regression expression.

The repeat controller 28 causes the selector 20, training unit 22, evaluation metric calculator 24, and regression expression generator 26 to repeat the sequence of the respective selection task, training task, evaluation-metric generation task, and regression expression generation task until a predetermined termination condition of the repeating of the sequence is satisfied.

The integrated-model generator 30 selects, from the generated candidate integrated-models Sc, one of the candidate integrated-models Sc after the predetermined termination condition is satisfied; the selected one of the candidate-integrated models Sc has the best value of the evaluation metric, i.e. the lowest value of the error Z, in all the generated candidate integrated-models Sc.

Figure 3:
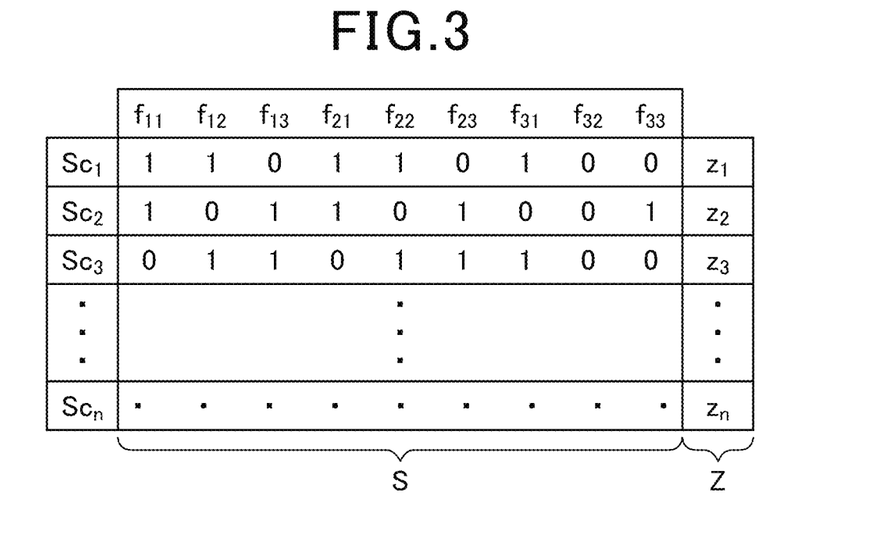
FIG. 3 is a table schematically illustrating an example of combinations each comprised of candidate models according to the exemplary embodiment.

FIG. 3 schematically illustrates that candidate integrated-models Sc obtained by the repeating of the sequence, which are expressed by candidate integrated-models $Sc_1$ to $Sc_n$, and corresponding errors Z obtained by the repeating of the sequence, which are expressed by errors $Z_1, Z_2, \ldots, Z_n$, are sequentially stored in the large-capacity storage device 18. Note that n, which is an integer more than or equal to 2, represents a repetition-number variable indicative of the repetition number of the sequences.

For example, as described above, the first candidate integrated-model $Sc_1$ illustrated in FIG. 2 is expressed by the parameter set $\{1, 1, 1, 1, 1, 0, 1, 0, 0\}$. Inputting the input data items V of the test dataset (V, W) to the first combination Sc1 in the first sequence results in the first error $Z_1$ being obtained. The regression expression calculator 26 calculates the regression expression in accordance with the first candidate integrated-model $Sc_1$ and the first error $Z_1$.

Then, the selector 20 selects a second candidate integrated-model $Sc_2$ of candidate models expressed by the parameter set $\{1, 0, 1, 1, 0, 1, 0, 0, 1\}$ in the second sequence. Inputting the input data items V of the test dataset (V, W) to the second candidate integrated-model $Sc_2$ in the second sequence results in the second error $Z_2$ as a value of the evaluation metric being obtained. The regression expression calculator 26 calculates the regression expression in accordance with both the first relationship between the first candidate integrated-model $Sc_1$ and the first error $Z_1$ and the second relationship between the second candidate integrated-model $Sc_2$ and the second error $Z_2$. This enables the prediction accuracy of the regression expression to be higher than the prediction accuracy of the regression expression calculated in the first sequence.

Then, the selector 20 selects a third candidate integrated-model $Sc_3$ of candidate models expressed by the parameter set $\{0, 1, 1, 0, 1, 1, 1, 0, 0\}$ in the third sequence. Then, the third sequence of the selection task, training task, evaluation-metric generation task, and regression expression generation task are performed based on the combinations $Sc_1$, $Sc_2$, and $Sc_3$ in the same manner as the first sequence or second sequence.

That is, repeating of selection of the candidate integrated-model, i.e. combination, $Sc_t$ (t=1, 2, ..., n) of candidate models, training of the candidate integrated-model $Sc_t$, and calculation of the error $Z_t$ enables the number of data items, which are used to generate the regression expression, to increase, making it possible to calculate the regression expression with higher prediction accuracy on average.

Next, the following describes why the prediction accuracy of the regression expression becomes higher as the number of data items of the combinations $Sc_t$ and the errors $Z_t$ increases.

Figure 4:
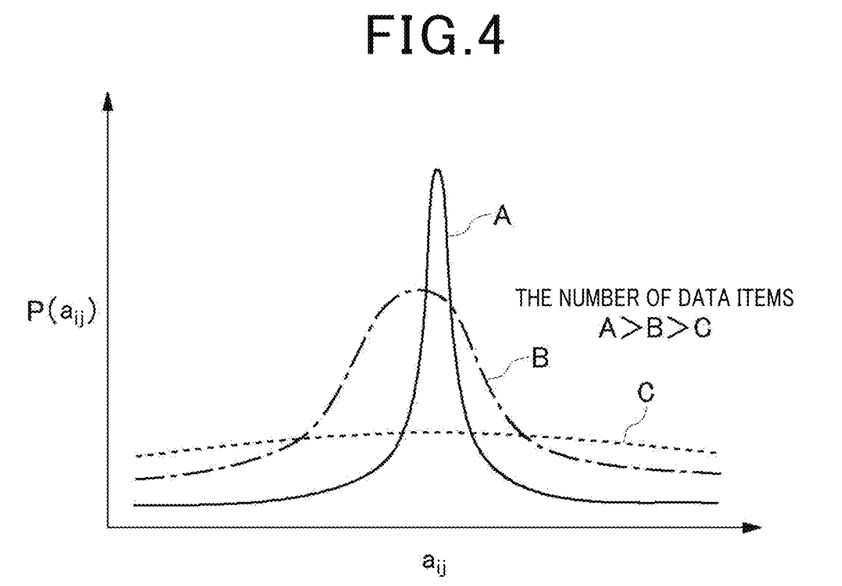
FIG. 4 is a graph schematically illustrating an example of a relationship between a weight parameter and an evaluation metric according to the exemplary embodiment.

As described above, the regression expression generator 26 of the exemplary embodiment statistically determines a value of each weight parameter $a_{ij}$ and a value of each weight parameter $b_i$ in accordance with a probability distribution $P(a_{ij})$ of the corresponding weight parameter $a_{ij}$ and a probability distribution $P(b_i)$ of the corresponding weight parameter $b_i$ (see FIG. 4). In other words, this process is the Bayesian regression, which determines the distributions, followed by determination of the weight parameters $a_{ij}$ and $b_i$ by sampling from the distributions. Note that FIG. 4 illustrates only an example of the probability distribution $P(a_{ij})$ of any weight parameter $a_{ij}$. The probability distribution $P(b_i)$ of any weight parameter $b_i$ has a similar distribution form of that of the probability distribution $P(a_{ij})$. The formulation of the Bayesian regression for combinatorial optimization problems was originally introduced by Baptista and Poloczek (https://arxiv.org/pdf/1806.08838.pdf). This document is incorporated in its entirely herein by reference.

If the number of data items, each of which represents the relationship between the corresponding candidate integrated-model $Sc_t$ and corresponding error $Z_t$, stored in the large-capacity storage device 18 is small, the probability distribution $P(a_{ij})$ of any weight parameter $a_{ij}$ has a broader distribution form (see the distribution form C illustrated in FIG. 4). An increase in the number of data items (see FIG. 3), each of which represents the relationship between the corresponding candidate integrated-model $Sc_t$ and corresponding error $Z_t$, enables the probability distribution $P(a_{ij})$ of any weight parameter $a_{ij}$ to have a narrower, i.e. sharper, distribution form (see the distribution forms B and A illustrated in FIG. 4). This therefore enables the prediction accuracy of the regression expression to become higher as the number of data items of the candidate integrated-models $Sc_t$ and corresponding errors $Z_t$ increases.

In particular, the selector 20 is configured to obtain a next candidate integrated-model $Sc_t$ of candidate models from the individual models using a representative value of each weight parameter $a_{ij}$ and a representative value of each weight parameter $b_i$ such that the obtained next candidate integrated-model $Sc_t$ of the candidate models enables the minimization function to be minimized.

For example, the selector 20 obtains, as the representative value of each weight parameter $a_{ij}$, a sampled value from the probability distribution $P(a_{ij})$ of the corresponding weight parameter $a_{ij}$, and obtains, as the representative value of each weight parameter $b_i$, a sampled value from the probability distribution $P(b_i)$ of the corresponding weight parameter $b_i$.

Note that the selector 20 of the exemplary embodiment is configured to select a next candidate integrated-model $Sc_t$ of candidate models such that the selected next candidate integrated-model $Sc_t$ minimizes the minimization function Z, which aims to improve the prediction accuracy of the corresponding regression expression. The selector 20 can be configured to select a next candidate integrated-model $Sc_t$ of candidate models without minimizing the minimization function Z. For example, the selector 20 can be configured to randomly select a next candidate integrated-model $Sc_t$ of candidate models from the individual models.

Figure 5:
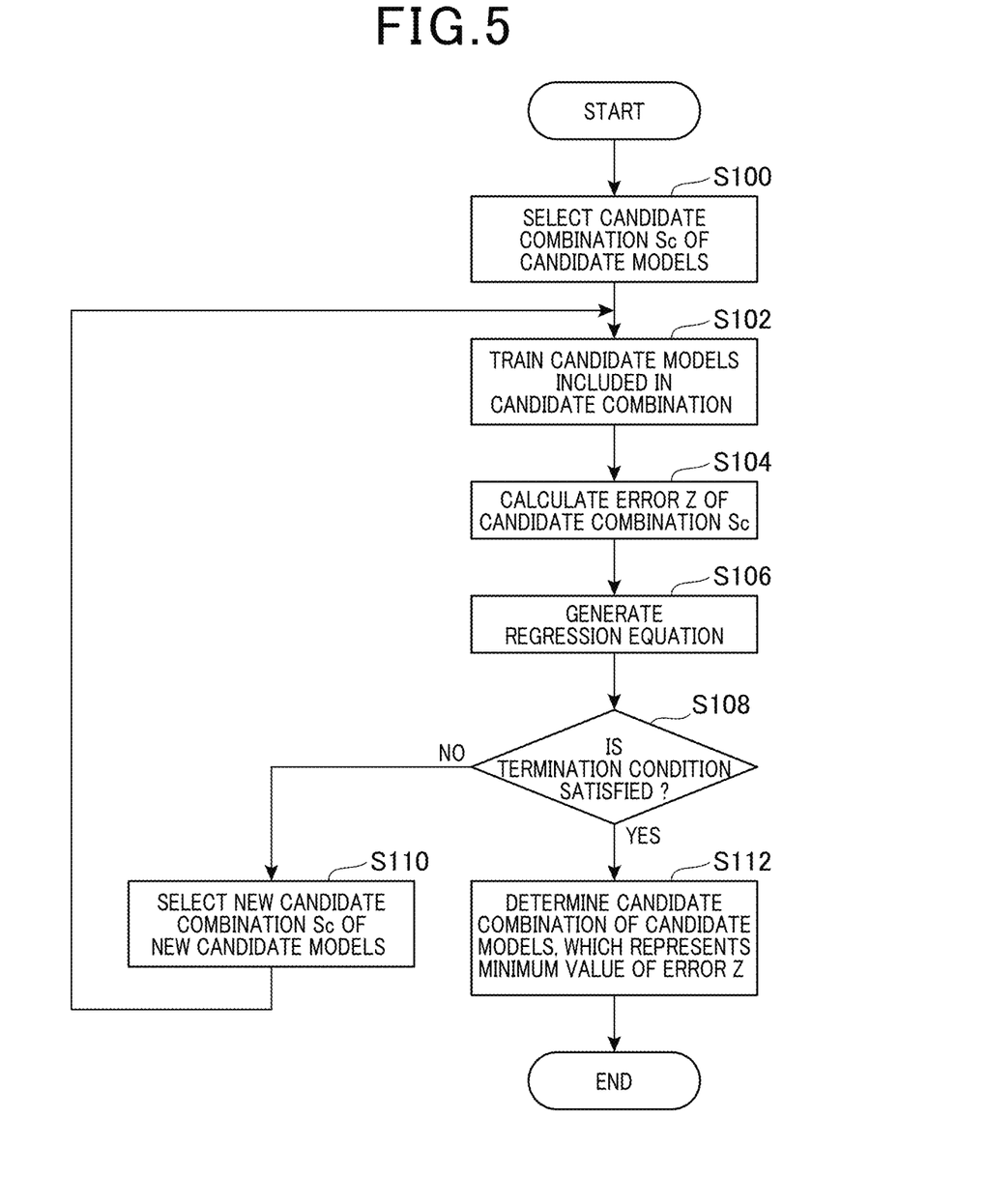
FIG. 5 is a flowchart schematically illustrating an example of a sequence of an integrated-model generating routine carried out by the processing unit illustrated in FIG. 1.

The following describes the integrated-model generating routine carried out by the processing unit 12 of the information processing apparatus 10 in accordance with the at least one program stored in, for example, the ROM 12. FIG. 5 is a flowchart schematically illustrating the sequence of the integrated-model generating routine carried out by the processing unit 12.

When starting the integrated-model generating routine, the processing unit 12 serves as the selector 20 to select, from the individual models, a combination $Sc_1$ of candidate models $f_{kr}$ as a candidate integrated model $Sc_1$. For example, the selector 20 randomly selects, from the individual models, the candidate integrated-model $Sc_1$ of candidate models $f_{kr}$ in step S100.

Next, the processing unit 12 serves as the training unit 22 to individually train each of the candidate models $f_{kr}$ included in the candidate integrated-model $Sc_1$ in step S102.

Following the operation in step S102, the processing unit 12 serves as the evaluation metric calculator 24 to perform the evaluation-metric calculation task of applying the test dataset (V, W) to the candidate integrated-model $Sc_1$ comprised of the candidate models $f_{kr}$ in step S104.

Next, the processing unit 12 serves as the regression expression generator 26 to perform the regression-expression generation task of generating a regression expression indicative of the minimization function Z in accordance with the candidate integrated-model $Sc_1$ of the candidate models $f_{kr}$ and the corresponding error $Z_1$ in accordance with the expression (1) in step S106.

Following the operation in step S106, the processing unit 12 serves as the repeat controller 28 to determine whether the predetermined termination condition is satisfied based on, for example, a repetition-number variable t of the candidate integrated-model $Sc_t$ and/or the error $Z_t$ in step S108.

Specifically, the repeat controller 28 for example checks whether the repetition-number variable t has reached a predetermined threshold number, and determines that the predetermined termination condition is satisfied upon checking that the repetition-number variable t has reached the predetermined threshold number (YES in step S108). As another example, the repeat controller 28 checks whether the error $Z_t$ becomes lower than or equal to a predetermined threshold value, and determines that the predetermined termination condition is satisfied upon checking that the error $Z_t$ becomes lower than or equal to the predetermined threshold value (YES in step S108). In contrast, the repeat controller 28 determines that the predetermined termination condition is not satisfied upon determining that the repetition-number variable t has not reached the predetermined threshold number (NO in step S108).

Upon confirming that the predetermined termination condition is satisfied (YES in step S108), the integrated-model generating routine proceeds to step S112. Otherwise, upon the predetermined termination condition is not satisfied (NO in step S108), the integrated-model generating routine proceeds to step S110.

In step S110, the processing unit 12 serves as the selector 20 to increment the repetition-number variable t by 1, i.e. t←t+1, and selects, from the individual models, candidate models $f_{kr}$ that constitute a new candidate integrated-model $Sc_{t+1}$.

Preferably, the selector 20 selects, from the individual models, candidate models $f_{kr}$ that constitute a new candidate integrated-model $Sc_{t+1}$ to enable the deviation between a predicted value of the error Z and a corresponding actually calculated value of the error Z to be smaller than that in the previous sequence.

In particular, the selector 20 more preferably selects, from the individual models, candidate models $f_{kr}$ that constitute a new candidate integrated-model $Sc_{t+1}$ to enable the deviation between a predicted minimum value of the error Z and a corresponding actually calculated minimum value of the error Z to be smaller than that in the previous sequence.

That is, the selector 20 is configured to select, from the individual models, new candidate models $f_{kr}$ that enables to generate a higher prediction accuracy regression expression on average as the number of the repeated sequences, i.e. data items, increases.

For example, the selector 20 of the exemplary embodiment selects, from the individual models, candidate models $f_{kr}$ in accordance with the following argument of the minimum of the function ($\Sigma_{i,j}a_{ij}s_i s_j + \Sigma_i b_i s_i + \lambda \Sigma_i \|s_i\|_1$) expressed by the following expression (2):

$$\text{argmin}_{Sc \in \{0,1\}^D} (\Sigma_{i,j}a_{ij}s_i s_j + \Sigma_i b_i s_i + \lambda \Sigma_i \|s_i\|_1) \quad (2)$$

where argmin $f(x)$ stands for argument of the minimum of the function $f(x)$, $\lambda \|s_i\|_1$ represents a normalization term with a hyper parameter $\lambda$, $\Sigma_i \|s_i\|_1$ represents a L1 norm, and D represents the number of individual models.

The expression (2), which serves as a searching condition of the all possible combinations of Sc, searches for, from the individual models included in the neural network 50, optimum candidate models $f_{kr}$ that constitute a candidate integrated-model $Sc_t$; the selected candidate models $f_{kr}$ minimizes the error Z. As described above, the third term $\lambda \Sigma_i \|s_i\|_1$ in the expression (2) represents the normalization term, and the hyper parameter $\lambda$ enables the number of candidate models $f_{kr}$ included in a candidate integrated-model $Sc_t$ to be adjusted. Because it is preferable that a minimum number of candidate models $f_{kr}$ selected from the individual models minimizes the error Z, the selector 20 adjusts the hyper parameter $\lambda$ to thereby adjust the number of candidate models $f_{kr}$ selected from the individual models.

As described above, the smaller the repetition number of the sequences from step S102 to S110, the lower the prediction accuracy of the regression expression, so that a selected candidate integrated-model Sc in accordance with the expression (2) is substantially close to a randomly selected candidate integrated-model Sc. In contrast, the larger the repetition number of the sequences from step S102 to S110, the higher the prediction accuracy of the regression expression, so that a selected candidate integrated-model Sc in accordance with the expression (2) become closer to an optimum candidate integrated-model Sc that the information processing apparatus 10 finally wants to obtain.

That is, the processing unit 12 is capable of covering various allowable combinations (candidate integrated-models) $Sc_t$ selected from the individual models while increasing the prediction accuracy of the regression expression. Note that the selector 20 can use another measure or means to thereby select, from the individual models, candidate models $f_{kr}$.

Following selection of the new candidate integrated-model Sc, the processing unit 12 repeats the sequence from step S102 to S110 based on the selected candidate integrated-models until the determination in step S108 is affirmative (YES in step S108).

That is, upon confirming that the predetermined termination condition is satisfied (YES in step S108), the processing unit 12 serves as the integrated-model generator 30 to determine one of the candidate integrated-models Sc after the predetermined termination condition is satisfied; the selected one of the candidate-integrated models Sc has the best value of the evaluation metric, i.e. the lowest value of the error Z, in all the generated candidate integrated-models Sc in step S112.

Next, the following describes a specific example using the integrated-model generating routine according to the exemplary embodiment.

Figure 6:
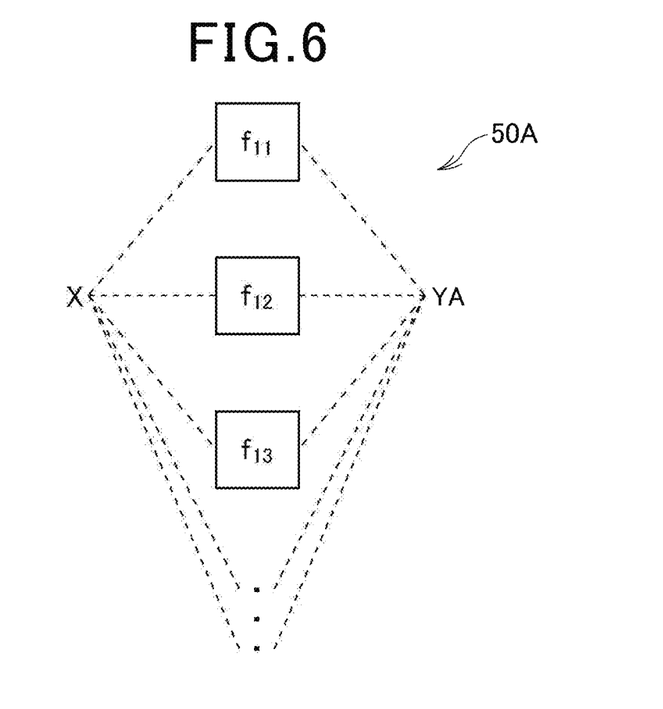
FIG. 6 is a diagram schematically illustrating an example of candidate models selected by the selector illustrated in FIG. 1 according to an example of the exemplary embodiment.

FIG. 6 schematically illustrates trained candidate models, i.e. predictors, constituting a neural network 50A. That is, the neural network 50A includes only the first layer comprised of the selected candidate models $f_{11}, f_{12}, f_{13}, \ldots, f_{1p}$, i.e. models $f_{kr}$ (k=1, r=1, ..., p where p is an integer more than or equal to 2).

Figure 7:
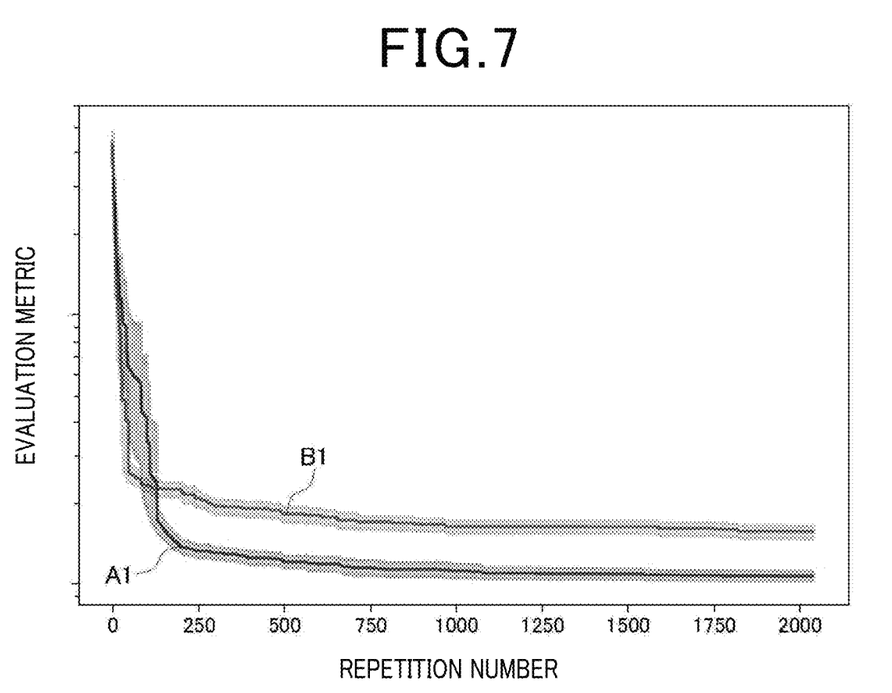
FIG. 7 is a graph schematically illustrating
(i) A first relationship between a temporal best evaluation metric (a performance curve) of integrated models generated based on the integrated-model generating routine according to the exemplary embodiment and a repetition number
(ii) A second relationship between a temporal best evaluation metric (a performance curve) of integrated models generated based on a random selection routine according to a comparative example and a repetition number.
Figure 8:
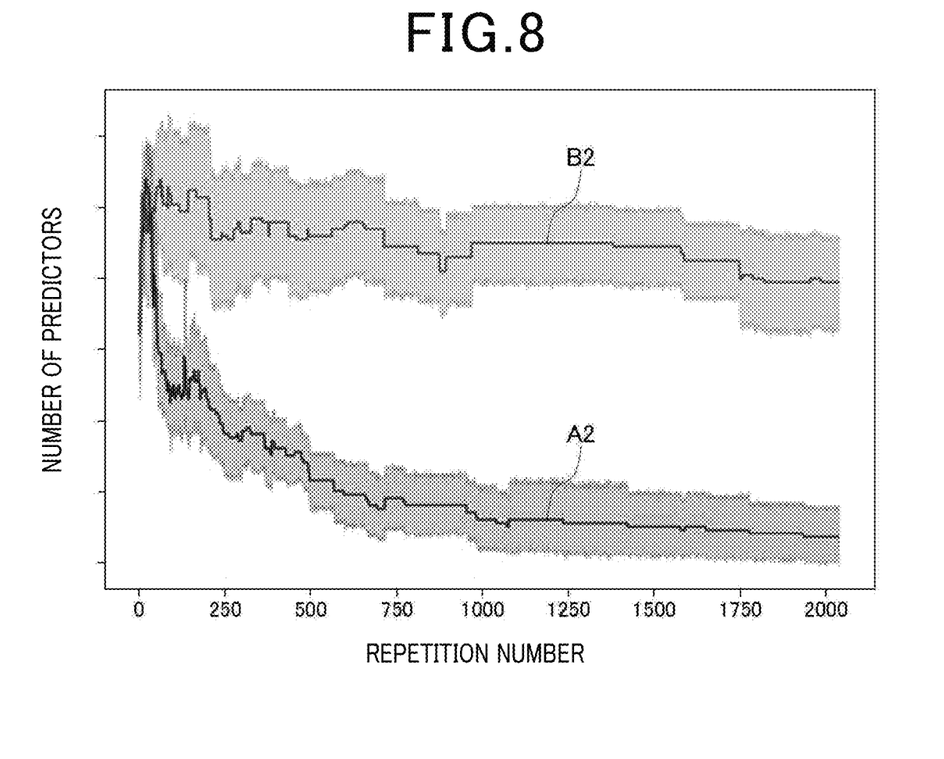
FIG. 8 is a graph schematically illustrating
(i) A first relationship between the number of trained candidate models of the temporal best integrated model, which corresponds to the temporal best evaluation metric, generated based on the integrated-model generating routine according to the exemplary embodiment and a repetition number
(ii) A second relationship between the number of trained candidate models of the temporal best integrated model, which corresponds to the temporal best evaluation metric, generated based on the random selection routine according to the comparative example and a repetition number

Each of FIGS. 7 and 8 is a graph schematically illustrating a corresponding one of evaluation results of an integrated model generated based on the neural network 50A. Note that the evaluation results of the integrated model based on the neural network 50A were measured when the number p of the candidate models $f_{kr}$ is set to 20.

FIG. 7 schematically illustrates
(i) A first relationship between the temporal best evaluation metric (a performance curve) A1 of the candidate integrated-models generated based on the integrated-model generating routine according to the exemplary embodiment and the repetition number (ii) A second relationship between the temporal best evaluation metric (a performance curve) B1 of candidate integrated-models generated based on a random selection routine, i.e. algorithm, according to a comparative example and the repetition number The random selection routine is designed to randomly select candidate models $f_{kr}$ from the individual models to thereby generate an integrated model. The exemplary embodiment for example uses, as the evaluation metric, a metric calculated based on a correlation coefficient between a predicted value, i.e. an output value, from the generated integrated model and a corresponding ground-truth data item. That is, the smaller the evaluation metric, the higher the prediction accuracy of the integrated model. Another evaluation metric indicative of an error between an output value of the integrated model and a corresponding ground-truth data item can be used.

FIG. 8 also schematically illustrates
(i) A first relationship between the number of trained candidate models, i.e. predictors, A2 of the best temporal integrated model, which corresponds to the temporal best evaluation metric, generated based on the integrated-model generating routine according to the exemplary embodiment and the repetition number
(ii) A second relationship between the number of trained candidate models, i.e. predictors, B2 of the best temporal integrated model, which corresponds to the temporal best evaluation metric, generated based on the random selection routine, i.e. algorithm, according to the comparative example and the repetition number FIG. 7 clearly shows that the integrated-model generating routine according to the exemplary embodiment results in the evaluation metric A1 being smaller than the evaluation metric B1 according to the comparative example as long as the repetition number is more than a hundred and several dozen times. FIG. 8 clearly shows that the number of predictors constituting the integrated model generated based on the integrated-model generating routine according to the exemplary embodiment is smaller than the number of predictors constituting the integrated model generated based on the random selection routine according to the comparative example.

In order to search for a combination of predictors from the 20 predictors constituting the single layered neural network 50A with higher prediction accuracy, it is necessary for the random selection routine to search for the combination of predictors among all possible $2^{20}$ combinations, i.e. approximately one million combinations as values of the evaluation metric of the integrated models obtained in the repeated sequences are not utilized. In contrast, we have found that, in order to search for a combination of predictors from the 20 predictors constituting the single layered neural network 50A with higher prediction-accuracy, it is necessary for the integrated-model generating routine according to the exemplary embodiment to search for the combination of predictors among approximately 2000 combinations.

That is, we have experimentally confirmed that the integrated-model generating routine according to the exemplary embodiment makes it possible to obtain an integrated model with a higher prediction accuracy than that of the random selection routine.

As described above, the integrated-model generating routine according to the exemplary embodiment has a function of providing an integrated model capable of predicting future events with higher accuracy while using a smaller number of predictors.

Because the integrated model generated based on the integrated-model generating routine according to the exemplary embodiment has a smaller number of predictors, i.e. trained models. This enables even computers with limited resources, such as embedded computers, to operate the predictors faster, making it possible to downsize the computers each installing therein the integrated-model generating routine. The smaller number of trained models, i.e. predictors, constituting the integrated model enables the integrated model to have a simpler configuration, making it possible for users to understand how the integrated model works and/or possible for the integrated model to have a white-box structure, which contributes to improvement of the quality of the integrated model.

Modifications

The exemplary embodiment of the present disclosure has been described, but the present disclosure is not limited to the above exemplary embodiment, and can be variably modified.

The exemplary embodiment is configured to train each of candidate models $f_{kr}$ selected as a combination Sc, but can be configured to select candidate models trained $f_{kr}$ selected from previously trained individual models.

The exemplary embodiment is configured to train each of candidate models included in a target layer using the input data items X and output data items outputted from candidate models included in at least one previous layer, but can be configured to train each of candidate models included in a target layer using the input data items X without using output data items outputted from candidate models included in each of previous layer.

The exemplary embodiment uses, as the search condition, the argument of the minimum of the function ($\Sigma_{i,j}a_{ij}s_is_j + \Sigma_i b_i s_i + \lambda \Sigma_i \|s_i\|_1$) expressed by the expression (2), because the exemplary embodiment uses, as the evaluation metric, the absolute difference between each of the output data items, i.e. ground-truth data items, W of the test dataset (V, W) and the corresponding one of the outputted data items WA from the integrated-model candidate. That is, the exemplary embodiment can use, as the searching condition, the argument of the maximum of another evaluation metric to thereby select candidate models from the individual models. For example, in order to obtain an optimum combination of commercial products, which has a maximized amount of sales of the combination, the exemplary embodiment can use the amount of sales of the combination as the evaluation metric, and search for a combination of candidate models, which maximizes the amount of sales of the combination.

The exemplary embodiment can use a neural network having at least one layer.

The present disclosure can be implemented by various embodiments in addition to the image processing apparatus; the various embodiments include systems each including the image processing apparatus, programs for serving a computer as the image processing apparatus, storage media, such as non-transitory storage media storing the programs, and image processing methods.

While the illustrative embodiment of the present disclosure has been described herein, the present disclosure is not limited to the embodiment described herein, but includes any and all embodiments having modifications, omissions, combinations (e.g., of aspects across various embodiments), adaptations and/or alternations as would be appreciated by those having ordinary skill in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. An apparatus for generating an integrated model from a plurality of individual prediction models, the apparatus comprising:

memory storing a set of computer program instructions; and at least one computer configured to perform, in accordance with the set of computer program instructions, an integrated model determination that includes:

a selection task of selecting, from the plurality of individual prediction models, a subset of plural individual prediction models as a combination of candidate models, the candidate models constituting a candidate integrated model;

a training task of training the candidate models using a training dataset;

an evaluation metric calculation task of applying a test dataset to the candidate integrated model to calculate an evaluation metric for evaluating an output of the candidate integrated model;

a regression expression generating task of generating a regression expression that represents a relationship between the evaluation metric and the candidate integrated model in accordance with an expression (1) as follows:

$$Z = \Sigma_{i,j} a_{ij} s_i s_j + \Sigma_i b_i s_i \qquad (1)$$

where:

Z represents the evaluation metric;

each of $s_i$ and $s_j$ is a selection indicator for each of the candidate models representing whether a corresponding one of the candidate models is included in the candidate integrated model;

$a_{ij}$ represents a weight parameter for the selection indicator $s_i$ and a weight parameter for the selection indicator $s_j$; and $b_i$ represents the weight parameter for the selection indicator $s_i$;

a repetition task of repeatedly performing a sequence of the selection task, the training task, the evaluation metric calculation task, and the regression expression generating task until a predetermined termination condition is satisfied, the selection task being configured to use an expression (2) as follows to accordingly select, from the plurality of individual prediction models, a new subset of new candidate models that constitute a new candidate integrated model as a new candidate for each sequence:

$$\mathrm{argmin}_{S c \in \{0,1\}^D} (\Sigma_{i,j} a_{ij} s_i s_j + \Sigma_i b_i s_i + \lambda \Sigma_i \|s_i\|_1) \qquad (2)$$

where:

argmin(x) stands for argument of a minimum of a function x, $\lambda$ represents a hyper parameter, $\Sigma_i \|s_i\|_1$ represents a L1 norm of $s_i$, Sc represents the combination, and D represents the number of the plurality of individual prediction models, and wherein:

the term $\lambda \Sigma_i \|s_i\|_1$ introduced in the expression (2) enables the selection task to search the plurality of individual prediction models for the new subset of new candidate models whose number is minimized, and the regression expression generated with an additional value of the evaluation metric from the new candidate combination of candidate models for each sequence has a higher prediction accuracy on average as the number of the repeated sequences increases; and a determination task of determining an integrated model based on the candidate integrated models and values of the evaluation metric after the termination condition is satisfied.

2. The apparatus according to claim 1, wherein:

the regression expression generating task includes obtaining each of the weight parameters of the regression expression in accordance with a probability distribution of the corresponding one of the weight parameters, the probability distribution being generated based on the candidate integrated models and the values of the evaluation metric.

3. The apparatus according to claim 1, wherein the regression expression includes at least one 3rd-order or higher-order term.

4. The apparatus according to claim 1, wherein:

the selecting of the candidate models is such that the candidate models constitute a neural network comprised of at least one layer, the at least one layer including at least one of the candidate models; and the training task includes:

applying the training dataset to the at least one of the candidate models included in the at least one layer to train the at least one of the candidate models included in the at least one layer.

5. The apparatus according to claim 4, wherein:

the at least one layer of the neural network comprises at least successively first and second layers, each of the first and second layers including at least one of the candidate models; and the training task includes:

applying the training dataset to the at least one of the candidate models included in the first layer to train the at least one of the candidate models included in the first layer, so that the at least one of the candidate models included in the first layer outputs a value; and applying the training dataset and the output value to the at least one of the candidate models included in the second layer to train the at least one of the candidate models included in the second layer.

6. The apparatus according to claim 5, wherein:

the at least first and second layers include an at least one common candidate model that is one of the candidate models.

7. The apparatus according to claim 1, wherein: the selecting of the candidate models is such that the number of candidate models is smaller than the number of all the individual prediction models.

8. The apparatus according to claim 1, wherein:

the evaluation metric includes a difference between the output of the candidate integrated model and a corresponding ground-truth item of the training dataset.

9. The apparatus according to claim 1, the at least one computer includes at least one quantum computer.

10. An apparatus for generating an integrated model from a plurality of individual prediction models, the apparatus comprising:

memory storing a set of computer program instructions; and at least one computer configured to perform, in accordance with the set of computer program instructions, an integrated model determination that includes:
- a selection task of selecting, from the plurality of individual prediction models, a subset of plural individual models as candidate models that constitute a candidate integrated model;
- an evaluation metric calculation task of applying a test dataset to the candidate integrated model to calculate an evaluation metric for evaluating an output of the candidate integrated model;
- a regression expression generating task of generating a regression expression that represents a relationship between the evaluation metric and the candidate integrated model in accordance with an expression (1) as follows:

$$Z=\Sigma_{i,j}a_{ij}s_is_j+\Sigma_ib_is_i \quad (1)$$

where:
- Z represents the evaluation metric;
- each of $s_i$ and $s_j$ is a selection indicator for each of the candidate models representing whether a corresponding one of the candidate models is included in the candidate integrated model:
- $a_{ij}$ represents a weight parameter for the selection indicator $s_i$ and a weight parameter for the selection indicator $s_j$; and
- $b_i$ represents the weight parameter for the selection indicator $s_i$;

a repetition task of repeatedly performing a sequence of the selection task, the training task, the evaluation metric calculation task, and the regression expression generating task until a predetermined termination condition is satisfied, the selection task being configured to use an expression (2) as follows to accordingly select, from the plurality of individual prediction models, a new subset of new candidate models that constitute a new candidate integrated model as a new candidate for each sequence:

$$\mathrm{argmin}_{Sc\in\{0,1\}}{}^D(\Sigma_{i,j}a_{ij}s_is_j+\Sigma_ib_is_i+\lambda\Sigma_i\|s_i\|_1) \quad (2)$$

where:
- argmin(x) stands for argument of a minimum of a function x,
- λ represents a hyper parameter,
- $\Sigma_i\|s_i\|_1$ represents a L1 norm of $s_i$,
- Sc represents the combination, and
- D represents the number of the plurality of individual prediction models, and wherein:
- the term $\lambda\Sigma_i\|s_i\|_1$ introduced in the expression (2) enables the selection task to search the plurality of individual prediction models for the new subset of new candidate models whose number is minimized, and
- the regression expression generated with an additional value of the evaluation metric from the new candidate combination of candidate models for each sequence has a higher prediction accuracy on average as the number of the repeated sequences increases; and a determination task of determining an integrated model based on the candidate integrated models and values of the evaluation metric after the termination condition is satisfied.

11. A method of generating an integrated model from a plurality of individual prediction models, the method comprising:
- performing a selection task of selecting, from the plurality of individual prediction models, a subset of plural individual prediction models as candidate models that constitute a candidate integrated model;
- performing a training task of training the candidate models using a training dataset;
- performing an evaluation metric calculation task of applying a test dataset to the candidate integrated model to calculate an evaluation metric for evaluating an output of the candidate integrated model;
- performing a regression expression generating task of generating a regression expression that represents a relationship between the evaluation metric and the candidate integrated model in accordance with an expression (1) as follows:

$$Z=\Sigma_{i,j}a_{ij}s_is_j+\Sigma_ib_is_i \quad (1)$$

where:
- Z represents the evaluation metric;
- each of $s_i$ and $s_j$ is a selection indicator for each of the candidate models representing whether a corresponding one of the candidate models is included in the candidate integrated model;
- $a_{ij}$ represents a weight parameter for the selection indicator $s_i$ and a weight parameter for the selection indicator $s_j$; and
- $b_i$ represents the weight parameter for the selection indicator $s_i$;

repeatedly performing a sequence of the selection task, the training task, the evaluation metric calculation task, and the regression expression generating task until a predetermined termination condition is satisfied, the selection task being configured to use an expression (2) as follows to accordingly select, from the plurality of individual prediction models, a new subset of new candidate models that constitute a new candidate integrated model as a new candidate for each sequence:

$$\mathrm{argmin}_{Sc\in\{0,1\}}{}^D(\Sigma_{i,j}a_{ij}s_is_j+\Sigma_ib_is_i+\lambda\Sigma_i\|s_i\|_1) \quad (2)$$

where:
- argmin(x) stands for argument of a minimum of a function x,
- λ represents a hyper parameter,
- $\Sigma_i\|s_i\|_1$ represents a L1 norm of $s_j$,
- Sc represents the combination, and
- D represents the number of the plurality of individual prediction models, and wherein:
- the term $\lambda\Sigma_i\|s_i\|_1$ introduced in the expression (2) enables the selection task to search the plurality of individual prediction models for the new subset of new candidate models whose number is minimized, and
- the regression expression generated with an additional value of the evaluation metric from the new candidate combination of candidate models for each sequence has a higher prediction accuracy on average as the number of the repeated sequences increases; and determining an integrated model based on the candidate integrated models and values of the evaluation metric after the termination condition is satisfied.

12. A computer-readable program product comprising:
a non-transitory computer-readable storage medium; and
a set of computer program instructions stored in the computer-readable storage medium, the instructions causing a computer to serve as:
a first means for performing a selection task of selecting, from the plurality of individual prediction models, a subset of plural individual prediction models as candidate models that constitute a candidate integrated model;
a second means for performing a training task of training the candidate models using a training dataset;
a third means for performing an evaluation metric calculation task of applying a test dataset to the candidate integrated model to calculate an evaluation metric for evaluating an output of the candidate integrated model;
a fourth means for performing a regression expression generating task of generating a regression expression that represents a relationship between the evaluation metric and the candidate integrated model in accordance with an expression (1) as follows:

$$=\Sigma_{i,j}a_{ij}s_is_j+\Sigma_i b_i s_i \tag{1}$$

where:
Z represents the evaluation metric;
each of $s_i$ and $s_j$ is a selection indicator for each of the candidate models representing whether a corresponding one of the candidate models is included in the candidate integrated model;
$a_{ij}$ represents a weight parameter for the selection indicator $s_i$ and a weight parameter for the selection indicator $s_j$; and
$b_i$ represents the weight parameter for the selection indicator $s_i$;
a fifth means for causing the first means, the second means, the third means, and the fourth means to repeatedly perform a sequence of the selection task, the training task, the evaluation metric calculation task, and the regression expression generating task until a predetermined termination condition is satisfied, the selection task being configured to use an expression (2) as follows to accordingly select, from the plurality of individual prediction models, a new subset of new candidate models that constitute a new candidate integrated model as a new candidate for each sequence:

$$\mathrm{argmin}_{S_c\in\{0,1\}^D}(\Sigma_{i,j}a_{ij}s_is_j+\Sigma_i b_i s_i+\lambda\Sigma_i\|s_i\|_1) \tag{2}$$

where:
argmin(x) stands for argument of a minimum of a function x,
$\lambda$ represents a hyper parameter,
$\Sigma_i\|s_i\|_1$ represents a L1 norm of $s_j$,
Sc represents the combination, and
D represents the number of the plurality of individual prediction models,
and
wherein:
the term $\lambda\Sigma_i\|s_i\|_1$ introduced in the expression (2) enables the selection task to search the plurality of individual prediction models for the new subset of new candidate models whose number is minimized, and
the regression expression generated with an additional value of the evaluation metric from the new candidate combination of candidate models for each sequence has a higher prediction accuracy on average as the number of the repeated sequences increases; and
a sixth means for determining an integrated model based on the candidate integrated models and values of the evaluation metric after the termination condition is satisfied.

* * * * *